United States Patent
Aharoni

(10) Patent No.: US 10,365,298 B2
(45) Date of Patent: Jul. 30, 2019

(54) OPTICAL KNIFE-EDGE DETECTOR WITH LARGE DYNAMIC RANGE

(71) Applicant: Technion Research & Development Foundation Limited, Haifa (IL)

(72) Inventor: Abraham Aharoni, Rehovot (IL)

(73) Assignee: Technion Research & Development Foundation Limited, Haifa (IL)

( * ) Notice: Subject to any disclaimer, the term of this patent is extended or adjusted under 35 U.S.C. 154(b) by 102 days.

(21) Appl. No.: 15/030,162

(22) PCT Filed: Nov. 24, 2014

(86) PCT No.: PCT/IL2014/051017
§ 371 (c)(1),
(2) Date: Apr. 18, 2016

(87) PCT Pub. No.: WO2015/075723
PCT Pub. Date: May 28, 2015

(65) Prior Publication Data
US 2016/0238631 A1 Aug. 18, 2016

Related U.S. Application Data

(60) Provisional application No. 61/908,209, filed on Nov. 25, 2013.

(51) Int. Cl.
*G01Q 20/02* (2010.01)
*G01D 5/34* (2006.01)
(Continued)

(52) U.S. Cl.
CPC ............. *G01Q 20/02* (2013.01); *G01D 5/342* (2013.01); *G01H 9/00* (2013.01); *G01J 1/4257* (2013.01)

(58) Field of Classification Search
CPC .......... G01Q 20/02; G01J 1/4257; G01H 9/00; G01D 5/342
See application file for complete search history.

(56) References Cited

U.S. PATENT DOCUMENTS

| 5,294,804 A | 3/1994 | Kajimura |
| 5,394,741 A * | 3/1995 | Kajimura ............... G01Q 20/02 356/614 |
| 7,957,006 B2 | 6/2011 | Aharoni |

FOREIGN PATENT DOCUMENTS

| EP | 0394962 A2 | 10/1990 |
| EP | 0394962 A3 | 10/1990 |
| EP | 0551814 A1 | 7/1993 |

OTHER PUBLICATIONS

International Search Report of a counterpart foreign application—PCT/IL2014/051017—dated Jul. 13, 2015—6 pages.
(Continued)

*Primary Examiner* — Tony Ko
(74) *Attorney, Agent, or Firm* — Roach Brown McCarthy & Gruber, P.C.; Kevin D. McCarthy

(57) ABSTRACT

A detection arrangement and method for directing the sensitivity of an optical knife-edge detection system to its optimal operating point. This is referred to as an increase in the detection dynamic range of the system with advantageous applications for detecting motion of a surface such as for Atomic Force Microscopy as well as detecting acoustic vibrations on unstable surfaces. A pair of parallel reflecting surfaces, such as an optical slab waveguide, serve to reflect the sensing beam back onto the knife-edge detector once it is shifted off its sensing range. Allowing multiple reflections, the sensing beam is maintained on the knife-edge detector even at large angular offsets from the optimal operating point of the basic knife-edge detector. Use of a modified arrangement, with two knife-edge detectors at quadrature (Continued)

ensures near-optimal sensitivity at a detection dynamic range up to forty-fold larger than that of the basic knife-edge system.

19 Claims, 16 Drawing Sheets

(51) Int. Cl.
    *G01H 9/00*         (2006.01)
    *G01J 1/42*         (2006.01)

(56) References Cited

OTHER PUBLICATIONS

Written Opinion of the International Searching Authority of a counterpart foreign application—PCT/IL2014/051017—dated Jul. 14, 2015—10 pages.
R. Adler at al., An Instrument for Making Surface Waves Visible, IEEE Trans. Son. Ultrason. SU-15 p. 157,1968 5 pages.

* cited by examiner

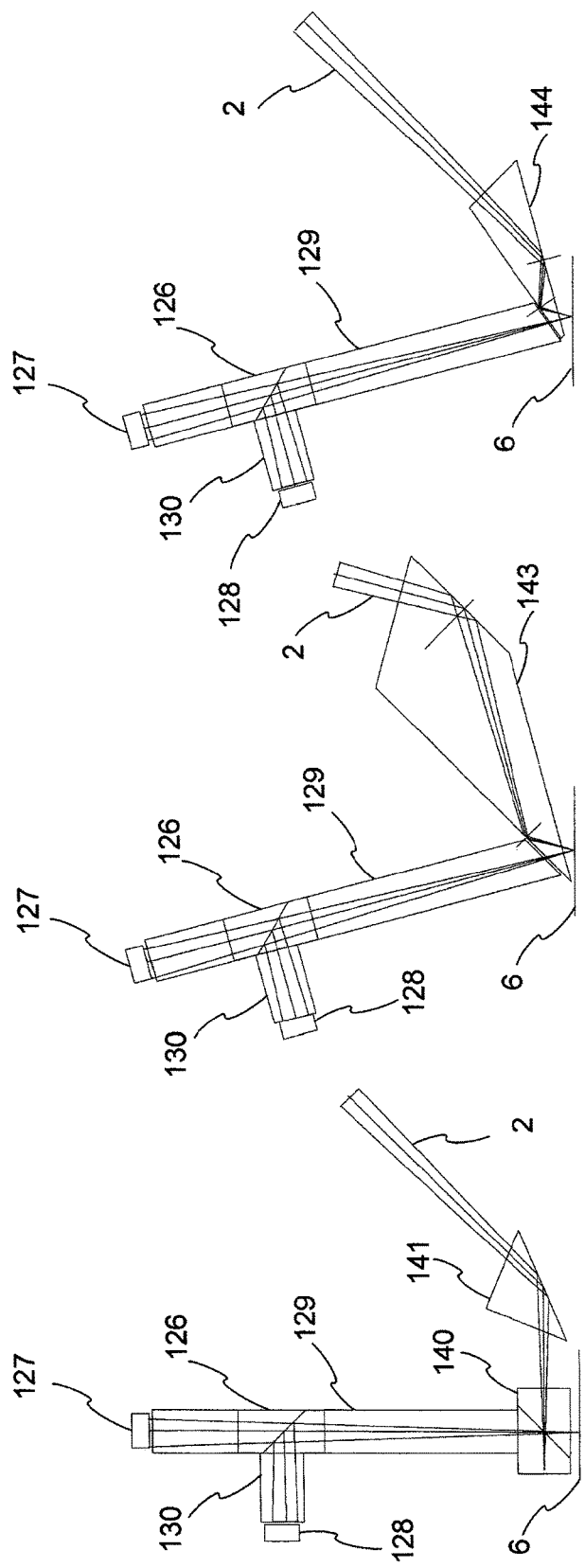

OPTICAL KNIFE-EDGE DETECTOR WITH LARGE DYNAMIC RANGE

FIELD OF THE INVENTION

The present invention relates to the field of optical knife-edge detection of small perturbations, especially for use in nanometric monitoring systems, such as for use in ultrasensitive sensors or in atomic force microscopy applications.

BACKGROUND OF THE INVENTION

Originally introduced by August Toepler in 1864 to photograph fluids of varying densities, the knife-edge technique (KET), also referred to as Schlieren photography, was adapted in the middle of the 20$^{th}$ century for detection and visualization of ultrasound, such as in the article "An instrument for making surface waves visible" by R. Adler et al, IEEE Trans. Son. Ultrason. SU-15 p. 157, 1968. Since then, the KET has seen a variety of applications for detection of minute perturbations, including dynamic sensors for the detection of perturbation induced by acoustic waves, as in U.S. Pat. No. 7,957,006 to the present inventor, as well as sensors for detection of perturbations of scanning devices, for example in atomic force microscopy (AFM).

Interferometry is often the intuitive selection for high resolution detection of displacement, but in different instances it can be replaced by other detection methods that are less susceptible to environmental effects. The present inventor has shown in an M.Sc. Thesis, Tel Aviv University, 1983, entitled "Optical probe for SAW velocity measurements", that in the shot-noise limited case, the theoretical sensitivity of interferometry and the KET are identical. As such the KET, which is an incoherent detection scheme, offers many practical advantages over interferometry: it is more robust, less sensitive to environmental effects, less sensitive to the illumination source's spectral stability, insensitive to speckle which compromises the performance of coherent detection methods, and can be designed to detect perturbations in one axis. Consequently it may be a preferred method for the applications noted above as well as many others.

Reference is first made to FIGS. 1A and 1B, which illustrate schematically the use of a prior art KET system in monitoring the tilt of a surface 6. This could be the surface of an AFM cantilever, as further detailed below, or a direct surface which is perturbed, as in voice detection on the human face for example. An illuminating beam 2 is focused by means of the lens system 4 onto the surface to be monitored, and the beam reflected from the surface is directed past a knife-edge 10 to a photodetector 12. When the surface is in a first position 6, part of the reflected beam, as designated by the solid lines 16, passes the knife-edge 10 to reach the photodetector 12, and part is blocked by the knife-edge. This is shown in the end view in FIG. 1B, where the knife-edge is seen to block a certain part of the beam, shown in FIG. 1B to be approximately half of the beam. When the surface has tilted, such that it is in a second position 14, the reflected beam as designated by the dashed lines 18, has a larger part of its cross-section blocked by the knife edge, as shown in FIG. 1B, where the total power of the illumination falling on the photodetector is now reduced. The power of the illumination on the photodetector is a direct function of the tilt of the surface 6 so that monitoring the power falling on the detector corresponds to monitoring the tilt of the surface 6. If the detector power calibration as a function of surface tilt is known, then the tilt can be directly measured.

In practical systems, the measurement sensitivity can be doubled if instead of a knife-edge with a single photodetector, a split detector configuration is used. Such an arrangement is shown in the simplified schematic of FIG. 2, which, as an example, could be used for monitoring the variation in the position of the stylus tip of an atomic force microscope (AFM). In this exemplary method, light from an illumination source, such as, for example, a solid state laser or a diode laser, is reflected off the back of a cantilever and is collected by a detector having two closely spaced photosensitive areas, which will be termed separate photodiodes, even though they may be constructed on a single substrate, one designated N and the other P. The output signals from N and P are input to a differential amplifier. Angular displacement of the cantilever results in movement of the reflected laser spot over the detector surface, such that the proportions of light collected by the N and the P photodiodes changes. The output signal from the differential amplifier corresponds to the difference in power collected by each section of the photodetector, which is designated P−N. This arrangement is essentially two knife-edge detectors back-to-back, each with a signal that corresponds to the deflection of the cantilever, but opposite in sign, so that the difference of the two signals also corresponds to the cantilever movement, but with an amplitude double that that would be obtained from a single photodetector.

There are two primary modes of operation for a nanometric detection system, such as could be used as an AFM probe—the static or DC mode and the dynamic or AC mode. In the static mode, the measurement cantilever, such as that of an AFM, is "dragged" across the surface of the sample and the contours of the surface are measured directly using the deflection of the cantilever. In the dynamic mode, the cantilever is externally oscillated at or close to its fundamental resonance frequency or a harmonic. The van der Waals forces, which are strongest from 1 nm to 10 nm above the surface of the sample, or any other long range force which extends above the surface, act to decrease the oscillation amplitude and the resonance frequency of the cantilever. In an AFM, for instance, these changes in oscillation with respect to the unperturbed reference oscillation provide information about the sample's characteristics, including the sample's profile, without the need for the cantilever stylus to touch the surface. A servo mechanism can be used to maintain the resonant frequency constant by changing the distance of the cantilever from the surface, such that instead of measuring the actual distance of the stylus from the surface, the frequency feedback signal, which mirrors that change of distance can be measured.

Reference is now made to FIG. 3A, which is a graph showing the voltage output expected from the two halves of the split detector of FIG. 2, and the output from the differential amplifier which represents the difference between the two outputs, as the beam spot traverses the split detector. The output is proportional to the light power reaching the detector. For simplicity the beam is assumed to be of circular section with radius r and of uniform intensity. Under these assumptions the area of detector covered by the beam spot represents the power collected by the detector. The graph is displayed in terms of the normalized area covered by the beam spot of radius r as a function of its offset d from the center of the boundary between the two halves of the split detector, that boundary being the equivalent of the knife-edge of FIG. 1. The curve with the short dashes represents the area of the spot on the positive detector P, while the curve with the long dashes represents the area of the spot on the negative detector N. The beam spot on the split detector has a diameter 2r, and the split sections of the detector are each 2r high as seen in FIG. 3B. The width of the detector in the dimension parallel to the boundary of the split detectors may be larger than 2r so the beam on each detector section is maintained at a relatively large distance from the detector's edge in the lateral dimension, ensuring that any lateral misalignment does not compromise the integrity of the signal. In other words, the fractional area of the beam on each detector section is directly related to the displacement d of the center of the beam from the boundary of the split detectors. When the beam spot is centered on the pair of photodetectors, i.e. for d=0, the beam is split equally between the P and N parts of the photodetector (left-most image of FIG. 3B), corresponding to the point of the graph of d/r=0, where it is seen that each section shows half the power of the beam (expressed in values of half the area of the beam spot, $\pi r^2/2 = 1.57\ r^2$, which is normalized to 1.57 on the graph). The axes of the graph of FIG. 3A are normalized to multiples of r (offset axis) and multiples of $r^2$ (illuminating power or corresponding output voltage axis).

Typically, the KET is used to detect small signals. Ideally the setup is arranged so that the illumination spot is centered on the split detector. At this location of the beam, as further explained below, the sensitivity is maximal. FIG. 3C shows schematically that a small perturbation, $\theta_0 \cos \omega t$, about an operating point close to d=0, introduces a corresponding signal $\theta_0 \alpha \cos \omega t$, at the output, where $\alpha$ represents the slope of the graph at the operating point. The output signal is proportional to the slope of the curve, and the maximal sensitivity occurs where the slope is maximal. It is also apparent from the graph that the sensitivity gradually reduces as the illumination spot is allowed to move away from the center, d=0: the slope of the curve in FIG. 3C is reduced with increasing distance from d=0, reaching zero sensitivity where the slope becomes zero at the positive and negative peaks of the graph. In other words the sensitivity of the KET detection drops off at an increasing rate as the setup departs from the optimal operation position at d=0 and the beam spot is allowed to shift away from the center of the detector. Consequently, to ensure a minimal working sensitivity the shift of the spot from the center of the detector should be limited. This permitted shift from the center of the detector is regarded as the dynamic range for alignment of the KET sensor. As is shown hereinbelow, this dynamic setup range is proportional to the sensitivity of the KET: the more sensitive the KET detection, the tighter the tolerance for the KET standoff from the center. It is the purpose of this invention to alleviate this limitation of tight setup tolerance while maintaining the higher detection sensitivity.

Referring back again to FIG. 3B, and looking first at the output from the positive element, P, as the spot moves away from d=0 to cover a larger portion of P, the area of the spot on P increases, indicating that power on P increases and hence the voltage generated by P increases, until all of the spot is located squarely on the P side of the detector. At this point, d=r, the area illuminating P is $\pi r^2 = 3.14\ r^2$ which is normalized to 3.14 on the graph (see second image from left of FIG. 3B). As the spot continues to move away from the center of the split detector, the area of the spot covering the P section now decreases through the point where it is half on the P detector section (at d=2r, third image from the left of FIG. 3B) until it is completely off the detector at d=3r where the area of P that is illuminated reaches 0 (right image of FIG. 3B). Similarly, when the detector spot moves in the opposite direction from d=0, the signal decreases until the beam is completely off the P section of the detector at d=−r, where the P signal becomes zero. At this same point the beam is completely located over the N section of the detector so that here the N section output is maximum, with a signal proportional to $3.14r^2$. The signal from the N section varies with the location of the illumination spot on the detector, d, in the same form as the P section signal, but it is inversed in sign and shifted, as is shown in the graph of FIG. 3A.

The output from the difference amplifier, representing the voltage P–N, is shown by the solid line in FIG. 3A, and as is observed in the graph, at the most sensitive location d=0, this P–N output has twice the slope of either the P output or the N output alone. The split detector configuration thus doubles the detection sensitivity of this virtual knife-edge configuration. The small signal sensitivity is proportional to the slope of the graph, and is maximum at d=0. The slope of the graph, and the small signal sensitivity, reach 0 at d=±r. Here two setup ranges are defined: the setup sensitivity range (SSR), spanning the entire range where any signal is obtained, and the setup dynamic range (SDR), confined to the setup range where a workable signal with good sensitivity is obtained. The SSR of the graph of FIG. 3A, is 6r, but it includes regions where there is very low sensitivity (around d=±r and d=±3r), and regions where the sign of the signal is inverted (where the slope is negative) in the regions −3r<d<−r and r<d<3r. The workable SDR may be defined as the region where the signal remains of the same sign and sensitivity drops monotonically to 50%. In the case of the graph of FIG. 3A the SDR is limited to approximately d=±0.9r. In other words the SDR for the split detector KET is 1.8r, or 90% of the diameter of a uniform beam spot. Note that, outside the SDR defined above, the output signal is both opposite in sign to that within the SDR and smaller than the signal within the SDR: is can be seen that the slopes of the response curves outside the SDR are necessarily less than 50% of the slope at the center of the detector at d=0. The above discussion is simplified under the assumption of a uniform, circular illumination spot with a sharp boundary. It is noted that using a more realistic beam illumination spot distribution, such as, for example, a Gaussian intensity distribution, similar characteristics to those of the simplified model above are obtained, but the graphs of FIG. 3A would have a "longer tail" extending beyond d=±3r. Therefore, it would be more accurate to use a detector having split sections of height somewhat more than 2r, where 2r would be the diameter of a spot having an equivalent top-hat profile. Nevertheless, the behavior and values of the graphs in the central portion for −r≤d≤r would be very similar and therefore the simplified analysis with a uniform beam spot is a good predictor of the practical performance of the performance of the split detector KET.

The discussion above relates to a KET detection system that is sensitive to angular perturbations of the detection surface 6 in FIG. 1. Slightly modified arrangements offer detection of perturbation normal to the surface, as described, for example in the above mentioned U.S. Pat. No. 7,957,006. Irrespective of such modifications to the KET arrangement, the nature of the detected signals is identical to those considered above, so that the discussion above and the present disclosure apply equally well to KET arrangements for detection of normal surface perturbations.

As described above, the SDR of a split detector KET is related to its sensitivity. In practice sensitivities as high as possible are sought. To increase the sensitivity, the spot size may be reduced and the length of the detection path, shown in the example of FIG. 1 as the distance between the tilting surface 6 and the plane of the knife-edge 10, increased. The spot size defines the dynamic range at approximately 0.9 of its diameter, and the length of the detection path increases the shift, d, for a given displacement of the surface 6. For very high sensitivities the alignment tolerance, or SDR, of the KET becomes impractical. This limitation severely curtails the usefulness of the knife edge technique, despite its simplicity and high sensitivity.

There therefore exists a need for a knife-edge configuration which overcomes at least some of the disadvantages of prior art systems and methods, in particular in providing a larger dynamic range to the detection arrangement.

The disclosures of each of the publications mentioned in this section and in other sections of the specification, are hereby incorporated by reference, each in its entirety.

SUMMARY

The present disclosure describes new exemplary systems for knife-edge detection of nanometric scale surface perturbations, providing a substantially larger setup dynamic range (SDR) than available previously. The optical perturbation (or displacement, these terms being used equivalently) to be measured or monitored may typically arise from motion of a pivoted mechanical element from which an optical beam is reflected, thereby converting the motion of the mechanical element into motion of an optical beam. Alternatively motion of the measurement surface itself may introduce the optical displacement. By this means, nanometric scale displacements can be measured or monitored.

The arrangement incorporates a pair of photodetector elements, having output voltages of opposite sign, each having a common abutting edge such that they resemble a split photodetector, and having an equal length in the direction in which the optical displacement is to be measured. The common abutting edge of the elements is aligned in such a direction that the illumination spot of an optical beam whose displacement is to be measured passes from illuminating one element to the other as the beam moves in the direction of the optical displacement. The common abutting edge may most conveniently be aligned perpendicular to the direction of the optical displacement. As an alternative to two abutted photodetector elements, use can be made of a detector on a single substrate, divided into two by scribing or during fabrication.

According to prior art methods of using such a pair of photodetector elements, the optical displacement to be measured is in the form of a single beam, for which the spot illuminating the photodetector pair traverses from one photodetector element to the other in the direction in which the optical displacement is to be detected. As the optical perturbation causes this beam spot to pass from one photodetector element to the other, because of the opposite signed output polarity of the photodetector elements, a differential signal generated from them generates a valley-and-peak shaped output, as shown in the graph of FIG. 3A, as the beam enters first one and then passes to the second of the photodetector elements. With a single beam, the total output thus covers a distance of 6r from first point of entry of the beam spot onto one of the photodetector elements, to the last point of departure from the second one of the photodetector elements, where r is the radius of the beam spot. This distance has been termed herein as the setup sensitivity range (SSR). The useful working range or setup dynamic range (SDR) of such prior art detection configurations, which is the range in which the signal is maintained of the same sign and the detection sensitivity is maintained above 50%, is further limited to some 90% of the beam spot diameter.

According to a first exemplary implementation of the systems of the present disclosure, instead of a single optical beam, the optical perturbation to be detected is in the form of a plurality of equally sized beams, serially spaced apart by distances equal to twice the width of each photodetector element in the direction in which the optical perturbation is to be measured. In this arrangement, as soon as the last portion of a specific beam spot has just departed from the secondly illuminated photodetector element, the next beam spot in the plurality of beams is just entering the first illuminated photodetector element, such that the valley-and-peak shaped differential output signal is then repeated for the second beam, and likewise for subsequent beams. If the detection arrangement is then made to follow this sequence of valley-and-peak shaped outputs, spanning 6r for each beam spot, the range where signals can be detected, or SSR is increased by a multiple of the number of beams in the plurality of beams. Similarly, the SDR is also increased by a multiple of the number of beams in the plurality of beams, though the lack of contiguity of such dynamic ranges presents a difficulty that will be addressed hereinbelow.

A plurality of equally sized and equally spaced beams is impractical both from consideration of complexity and consideration of power efficiency. It is important to maximize the power illuminating the photodetector pair for optimal performance. Therefore it would be preferable to incorporate the illumination power available into one beam and not split it between many such beams, which could result from dividing a single beam down into the separate beams. Consequently, according to a more practical second exemplary implementation, the effect of a plurality of equally spaced beams can be synthesized by use of a pair of reflecting surfaces, such as mirrors, disposed on either side of the single incident beam, and generally parallel to the common abutment edges of the photodetector element pair. The reflecting surfaces are aligned such that when looking down the corridor generated by the pair of reflecting surfaces, the pair of detector elements is seen at the end of the corridor, with their common abutment edges running across the corridor at half of its height. As the angle of incidence of the beam changes, the light beam spot illuminating the photodetector pair traverses the two photodetector elements sequentially, passing from the first to the second, and then again from the first to the second sequentially as the angle of incidence of the beam continues to increase in the same direction. By this means a single beam can be transformed into a virtual plurality of beams, spaced apart by the spacing of the reflecting surfaces, namely 4r. This configuration thus emulates the multiple beam configuration of the first implementation described hereinabove, but without the need to physically generate a plurality of beams.

A particularly simple method of providing such a pair of reflecting surfaces is by positioning a slab waveguide perpendicular to the plane of the photodetector elements and with its center aligned to coincide with the common abutment edges of the elements. The optical beam carrying the required perturbation can be simply directed into the end of the waveguide opposite that of the photodetector elements, and it travels down the waveguide being totally internally reflected off the waveguide walls.

Typically such nanometric motion detection systems are operated in the AC mode, where the beam is oscillated by induced vibrations of the deflection arm generating the reflected beam. In order to maintain high detection sensitivity, a method must be found to avoid the need to make measurements where the slope of the difference amplifier output is small, i.e. near the maximum and minimum of the output signal from the difference amplifier. According to further implementations of the present disclosure, this can be achieved by performing the detection on a pair of quadrature spaced beams. In general, quadrature detection is performed by using two outputs spaced apart by a quarter cycle (90°) phase difference of the phenomenon being measured. In these systems, the two quadrature detections are performed on a pair of spatially separated beams, set apart at their detection point by an effective distance equal to one quarter of the spatial cycle of the sensing being performed. Since the spatial sensing cycle of the detection systems of the present disclosure is 4r, where r is the radius of the illumination spot on the split detectors, quadrature operation requires that the beam spots be a distance r apart at their detection plane. This can be implemented in the waveguide embodiments described herein, by splitting the sensing beam into a pair of beams, and transmitting them down a pair of waveguides, with the split detectors for each beam being arranged such they are a distance r apart at the plane where the beam spots impinge on them.

There is thus provided in accordance with an exemplary implementation of the devices described in this disclosure, a system for monitoring change in the direction of incidence of a light beam, comprising:

(i) a pair of optical reflecting surfaces disposed such that the light beam traverses between them, and aligned generally perpendicular to the direction in which the change in the direction of incidence of the light beam is to be monitored, and (ii) a pair of juxtaposed photodetector elements disposed at one end of the pair of optical reflecting surfaces, the boundary between the juxtaposed pair being aligned in the space between the optical reflecting surfaces such that the illumination spot of the beam passes from one photodetector element to the other as the direction of incidence of the beam changes.

In such a system, the boundary may be located in the center of the space between the optical reflecting surfaces. Furthermore, the pair of optical reflecting surfaces may be disposed such that the light beam traversing between the pair of optical reflecting surfaces illuminates sequentially the pair of photodetector elements as its direction of incidence changes. In either of the above described exemplary systems, the pair of optical reflecting surfaces may be spaced apart at least by a distance equal to the effective diameter of the illumination spot of the light beam on the surfaces of the pair of photodetector elements. Additionally, the signals from the pair of photodetector elements should change sequentially with the change in direction of incidence of the light beam.

According to yet other implementations of the above described systems, the pair of optical reflecting surfaces may be spaced apart at least by a distance equal to the effective diameter of the illumination spot of the light beam on the surface of the pair of photodetector elements.

In any of the above described systems, the pair of optical reflecting surfaces may be either a pair of mirror surfaces, or they may be the outer surfaces of an optical waveguide. Furthermore, whichever configuration is used, the pair of optical reflecting surfaces may extend from the pair of photodetector elements to the vicinity of the point of divergence of the beam.

With regard to the pair of photodetector elements described in the above mentioned systems, the boundary between the juxtaposed pair photodetector elements may be aligned perpendicular to the direction in which the incidence angle of the beam is to be measured. Furthermore, the pair of photodetector elements may be the same size along the direction in which the change in the direction of incidence of the light beam is to be monitored. In the latter case, the dimension of each of the pair of photodetector elements should be at least equal to the diameter of the light beam at the point of impingement on the photodetector elements. Additionally, the pair of juxtaposed photodetector elements may be either two separate photodetector elements abutted to each other, or a single photodetector scribed to generate two separate photodetector elements.

Yet other implementations may involve a system such as any of those previously described, in which the change in the direction of incidence of the light beam arises from reflection of a light beam off a mechanical nanometric position monitoring element, or alternatively, is determined from the signal arising from the difference between the signals generated by the impingement of the light beam on each of the pair of photodetector elements.

Another example implementation can involve a system according to any of the previous described implementations, wherein (i) the pair of optical reflecting surfaces are a first pair, and the pair of photodetector elements are a first pair, and wherein (ii) the system further comprises a second pair of optical reflecting surfaces and a second pair of photodetector elements, and wherein (iii) the light beam is split by a beam splitter such that a first part traverses the first pair of optical reflecting surfaces and illuminates the first pair of surfaces and a second part traverses the second pair of optical reflecting surfaces illuminates the second pair of photodetector elements, and wherein (iv) the first and second pair of photodetector elements are disposed such that the boundaries between the juxtaposed pair of the first and second pair of photodetector elements are a distance apart in the direction in which the change in the direction of incidence of the light beam is to be measured, at least equal to the effective radius of the light beam.

In such a case, the difference signals from the first pair of photodetectors and the difference signals from the second pair of photodetectors may be processed to select the largest absolute value of each so as to ensure an extended setup sensitivity range for the system.

Alternatively, the sum of the square of the difference signals from the first pair of photodetectors and the square of the difference signals from the second pair of photodetectors may provide a monitor signal by which the direction of the incidence of the light beam may be monitored over a large dynamic range.

Still other example implementations involve a system for measuring the motion of an object, the system comprising:

(i) a system for generating a plurality of equally spaced and equally sized light beams, which move together according to the motion of the object, and (ii) a pair of photodetector elements on which the plurality of light beams is incident, disposed with an edge of each element juxtaposed and aligned in a direction such that the light beams pass from one element to the other as they move, wherein the pair of photodetector elements have the same length in the direction of motion of the light beams, the length being substantially equal to the diameter of any of the light beams at the point of impingement on the elements.

Finally, yet other implementations perform a method of increasing the dynamic range of an optical knife-edge detection system for detecting motion of a surface to be monitored, comprising:

(i) projecting a light beam onto the surface, (ii) positioning a pair of optical reflecting surfaces such that the light beam reflected from the surface to be monitored traverses between them, the pair of optical reflecting surfaces being aligned generally perpendicular to the direction in which the reflected light beam moves as a result of motion of the surface to be monitored, and (iii) disposing a pair of juxtaposed photodetector elements at an end of the pair of optical reflecting surfaces remote from where the reflected light beam enters between the pair of optical reflecting surfaces, the boundary between the juxtaposed pair being aligned in the space between the optical reflecting surfaces such that the illumination spot of the reflected light beam on the pair of juxtaposed photodetector elements passes from one photodetector element to the other as the surface to be monitored moves.

BRIEF DESCRIPTION OF THE DRAWINGS

The present invention will be understood and appreciated more fully from the following detailed description, taken in conjunction with the drawings in which:

FIGS. 13A-C and 14A-B illustrate alternative methods of providing geometrically efficient coupling of the reflected sensor beam into the waveguide, in which:

FIGS. 13A-13C illustrate different arrangements using a prism disposed between the motion detection surface and the input end of the waveguide; and FIGS. 14A-14B illustrate different arrangements using a prism at the side of the waveguide to enable input of the beam to the waveguide at an angle close to the waveguide axis.

DETAILED DESCRIPTION

Figure 4:
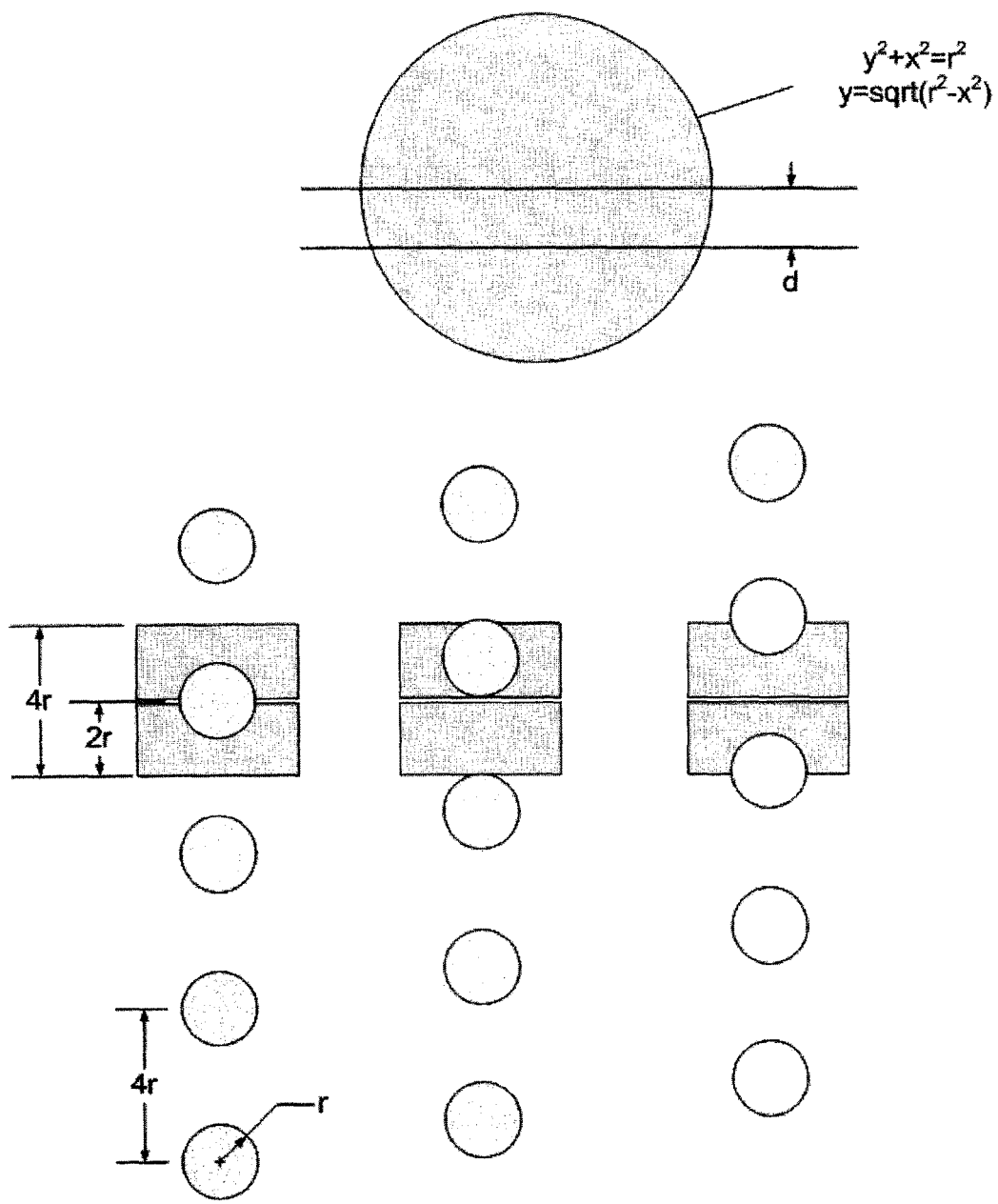
FIG. 4 is a view of a split detector such as that shown in FIG. 3B, but using an array of beams instead of a single beam, generated from reflections off the surface whose motion it is intended to measure.

Reference is now made to FIG. 4, which illustrates schematically the physical basis of a method by which the setup sensitivity and dynamic ranges (SSR and SDR) of the split detector knife-edge technique (KET) can be substantially increased. In this implementation, instead of a single beam being used to traverse the split detector to provide displacement information for that single spot, an array of beams is generated from reflections off the optically monitored surface, which can be the surface being measured or the surface of a cantilever which moves in accordance with the surface being measured. As the spots from these beams traverse the detector in sequence, the amplifier output responds continuously to the position of the particular spot traversing the split detector. The SSR range is then increased in proportion to the number of beams in the train of beam spots used—the greater the number of spots, the greater the SSR. In order to provide continuous signal coverage, the spots centers should be separated by a distance 4r, such that as one spot begins to leave the split detector, of length 4r, the next spot is just beginning to enter it. Similarly, the SDR is also increased by a multiple equal to the number of beams in the plurality of beams, although, as previously mentioned, since such dynamic ranges are not contiguous, a special technique must be used, as expounded hereinbelow.

This arrangement is shown schematically in FIG. 4, where the left hand drawing shows a spot centered on the split detector boundary (the "knife-edge"), the center drawing shows that same spot completely centered in the P detector, with the next spot about to enter the N detector. The last drawing on the right shows a shift of the spot train by an additional distance r, such that the previous spot is halfway off the P detector, while the next spot is halfway disposed on the N detector. Therefore, for each detector element, for a continuous shift of the spot array in one direction, as one spot leaves the detector area, the next one just begins to enter the detector area, so that the position information extracted from the differential amplifier output is maintained over the entire train of beam spots. At the top of FIG. 4 a sketch shows the geometry of a circular spot illumination area defined by a circle of radius r and a "knife-edge" shifted d off the centerline of the circle. The area is calculated by integrating the section between these two constraints.

Figure 3A:
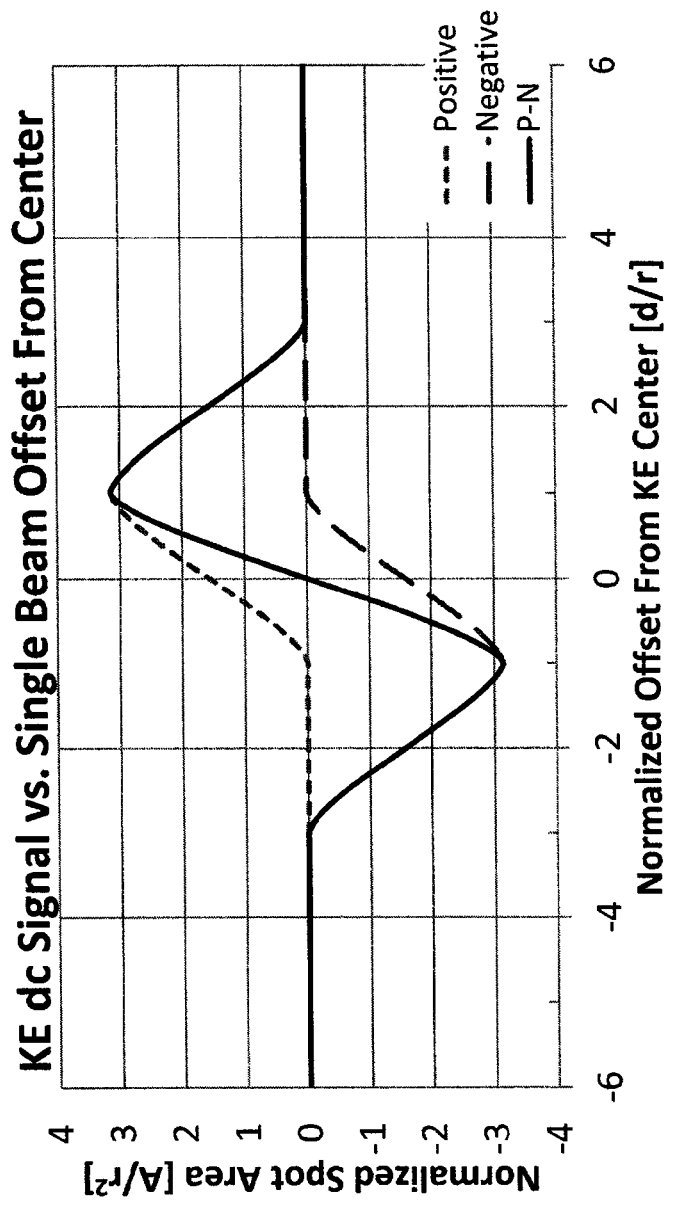
FIG. 3A is a graph showing the voltage outputs expected from the two halves of the split detector of FIG. 2, and from its differential amplifier.
Figure 3B:
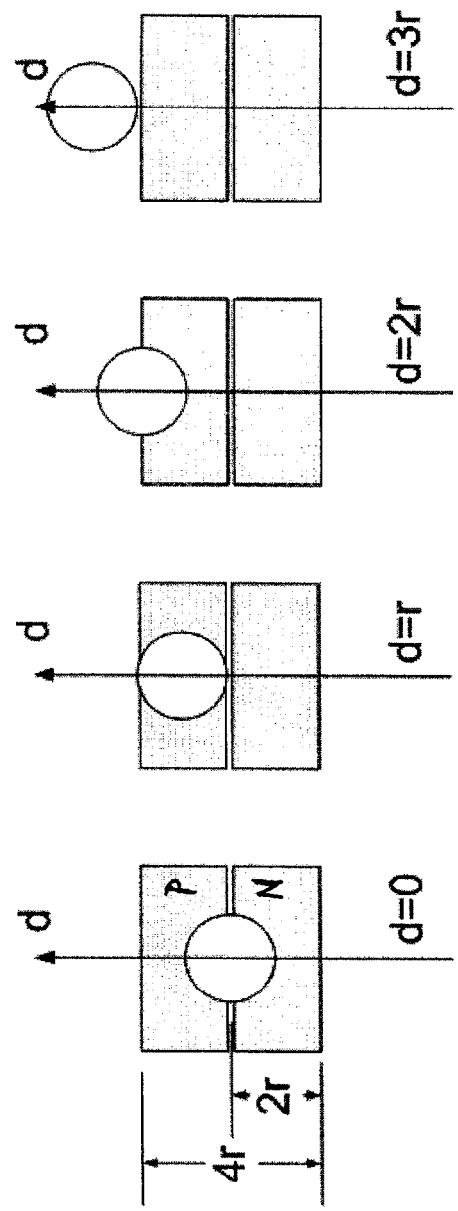
FIG. 3B is a view of different illumination spot locations on a prior art split photodetector, showing the different areas illuminated on each element as the spot traverses the split detector.
Figure 3C:
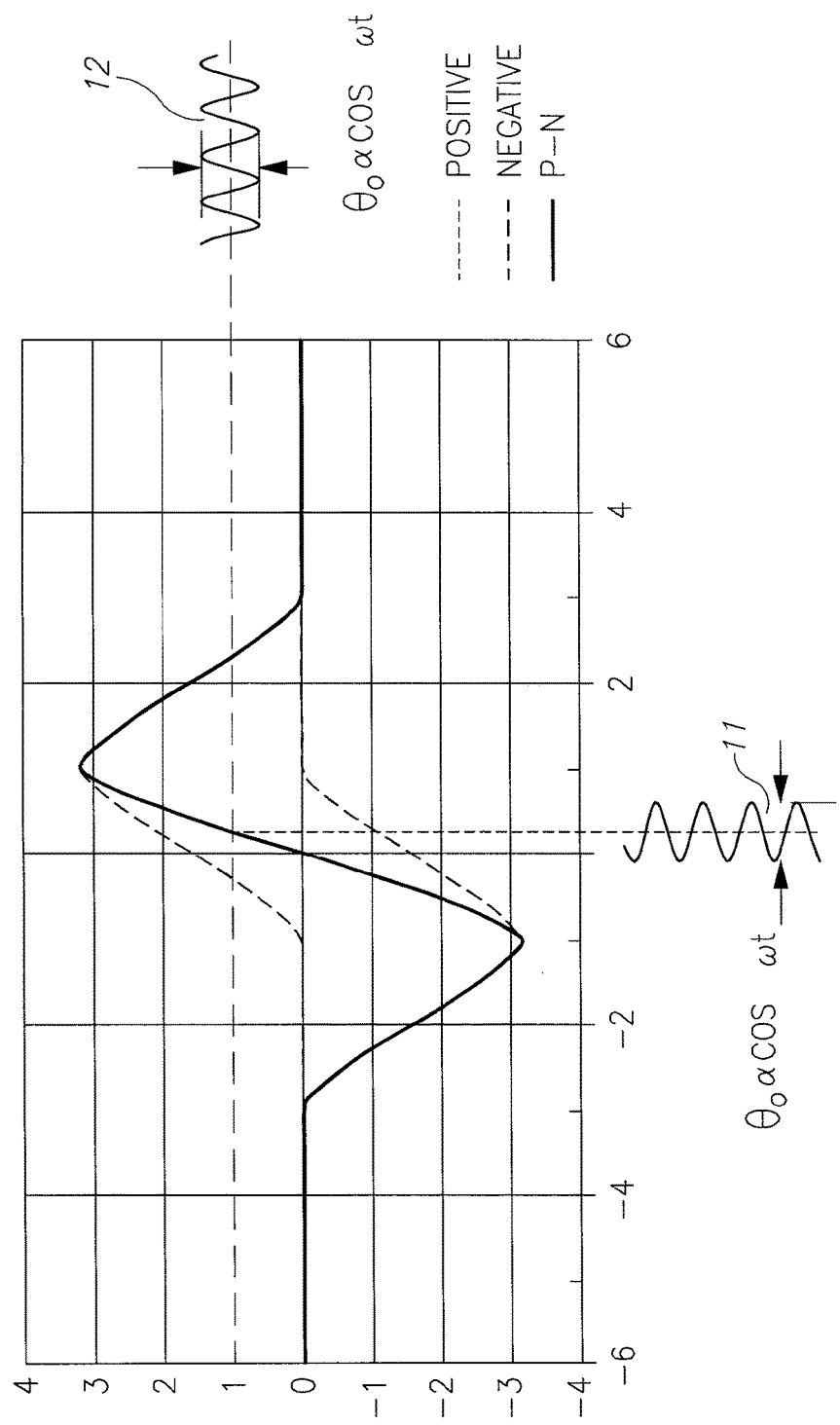
FIG. 3C is a schematic representation of the small signal output for a small signal input demonstrating the relation between detection sensitivity and the setup graph slope.
Figure 5:
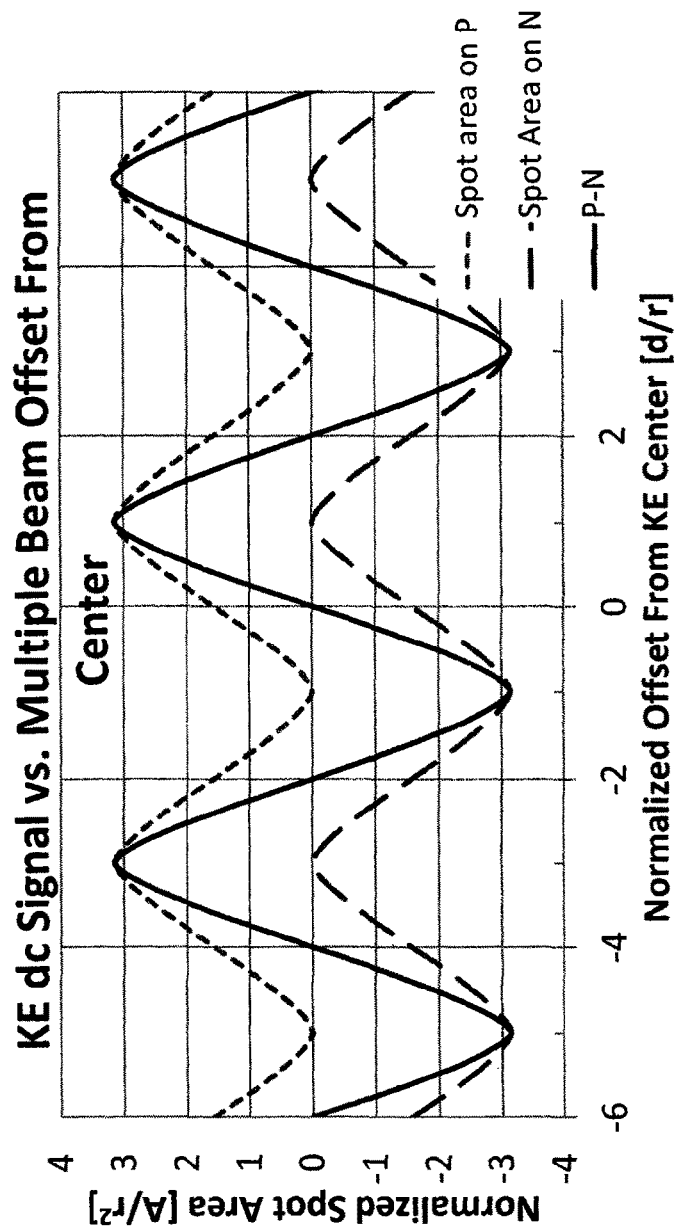
FIG. 5 is a graph showing the voltage outputs expected from the two halves of the split detector of FIG. 4, as the array of beams traverses the split detector.

Reference is now made to FIG. 5, which illustrates graphically how the P and N signals and the P–N difference output vary as the array of beam spots crosses the split detector. The results are similar to those of the single beam case shown in FIG. 3A, except that instead of a single cycle of changes in output levels, the output pattern is repeated for each of the separate beam inputs, with the cycle spacing being 4r, equal to the spacing of the sequential beam spots.

The output thus shows multiple cyclic regions of high detection sensitivity—where the differential amplifier output slope is large, such that a small spot perturbation results in a large differential output. The graph also shows that the SSR is enlarged by the number of beam spots used in the arrangement, effectively being an extension for the graph for one beam (FIG. 3A), showing successive regions having signal outputs of opposite sign. In principle, such reversal of the sign of the signal can be accommodated in practice by keeping track of the absolute shift of the illumination spot. One method could be to count the number of peaks of illumination on each detector element which separately pass as the spot shifts. This provides an absolute measure of the displacement from the initial undeviated position measured. This is difficult, however, to implement in practice if the direction of shift is not known, as it is impossible to differentiate between traversing two successive peak illuminations of a detector element for motion of the beam spot array in one direction, and traversing the same peak in a to and fro motion, if the beam spot array changes direction. In addition, any sensing based on the absolute detector outputs, or even the difference outputs between the two halves of the split detector has the disadvantage that at certain points in the range of sensing, the sensitivity to beam perturbation—which is the quantity which needs to be monitored—falls to zero, such that there are periodic regions where small changes of the position of the beam cannot be detected. Such regions occur whenever the slope of the detector output signal, or the slope of the detector difference output signal, falls to zero, which, as is evident from the graphs of FIG. 5, occurs at repeated separations of 2r. Therefore, a method must be found to ensure that the detection sensitivity is maintained over the entire enlarged dynamic range engendered by multiple beam use in this disclosure. In other words, whereas this arrangement ensures an SSR that is enlarged contiguously by a factor of the number of beams in the array of beams, the SDR is also enlarged by the same factor, but it is not contiguous. A method to ensure an enlarged, contiguous SDR is sought.

Figure 6:
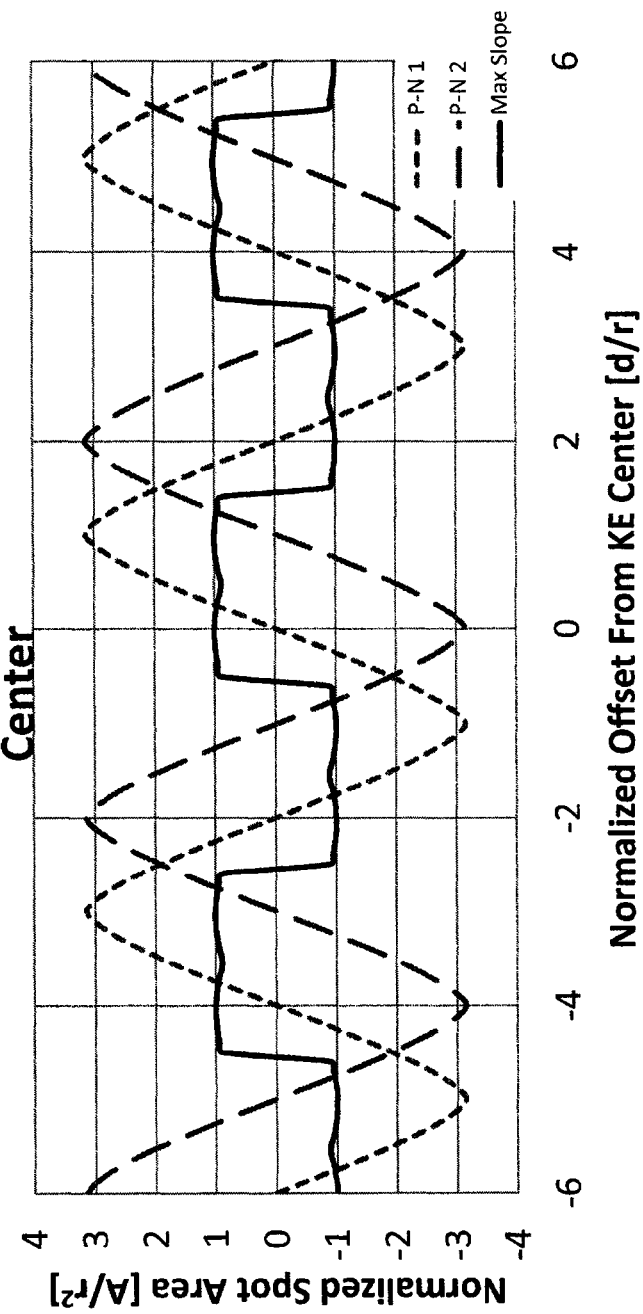
FIGS. 6 and 7 provide graphs of the voltage outputs expected from the two halves of the split detectors of a system using two position detection systems of the type described in FIG. 4, configured to provide output signals in quadrature, such that the absolute position can be determined at high sensitivity.
Figure 7:
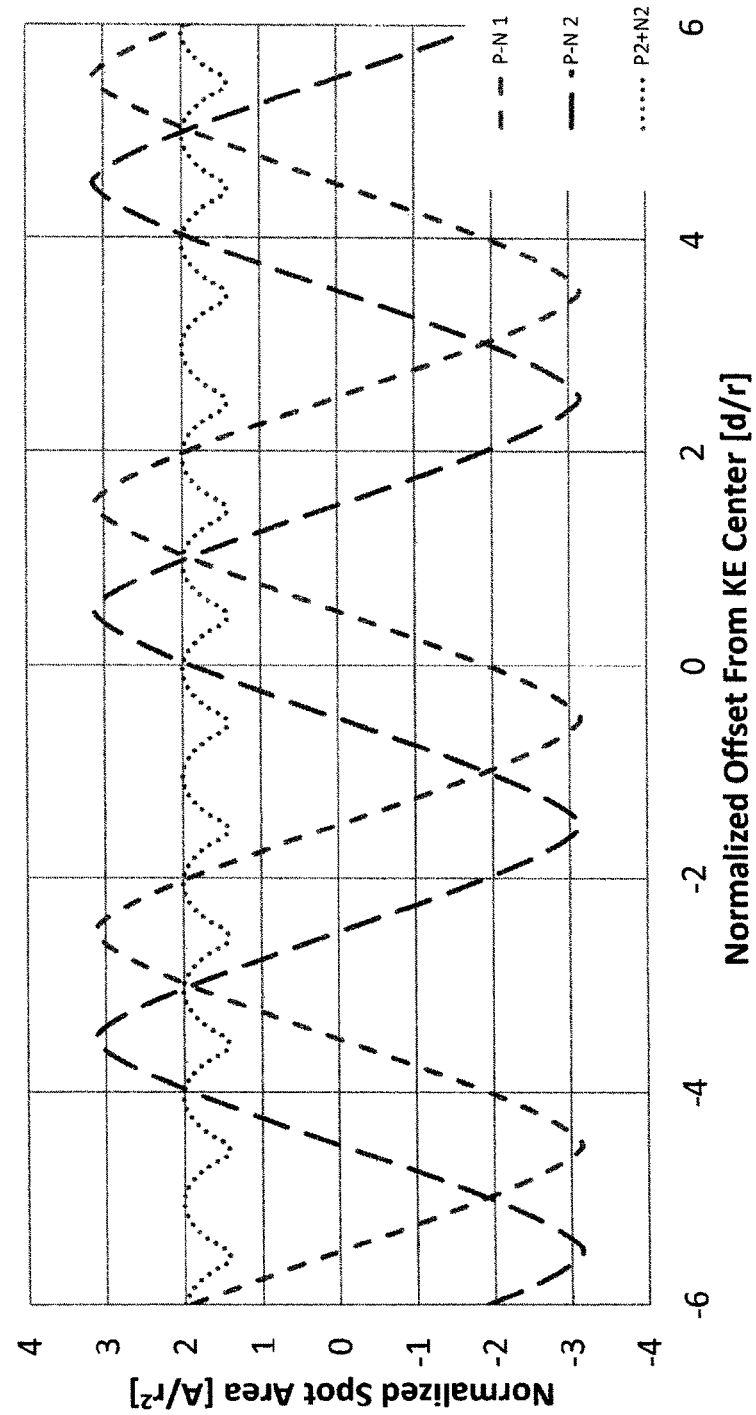

Reference is therefore made to FIGS. 6 and 7, which illustrate a method of ensuring the required enlarged and contiguous SDR monitoring. This is achieved by providing for two modified, multiple-beam KET arrangements in quadrature. The quadrature difference is obtained by shifting one of the KET detectors by a distance r with respect to the other, such that when the beam spot is centered on one KET detector, the beam spot on the other is at d=r. This shift is a quarter of the range of a complete cycle, 4r, hence providing the quadrature spatial "phase shift". These modified KET detection schemes thereby generate the two response graphs of FIGS. 6 and 7: one with the small dashes and one with the larger dashes. The two difference outputs of the two quadrature systems, 1 and 2, are marked $(P-N)_1$ and $(P-N)_2$. As is observed, the outputs are offset by a distance d=r, and when the sensitivity of one falls to zero, the other remains at a high sensitivity. As a consequence, there is now enough information to devise different functions to combine these two signals to obtain a contiguous, enlarged SDR. Once function that could be used is to select the first or second signal according to which of them has the higher absolute value, as follows:

If $|(P-N)_1| \geq |(P-N)_2|$, then use the signal $(P-N)_1$ as the signal output, but if $|(P-N)_1| \leq |(P-N)_2|$, then use the signal $(P-N)_2$ as the signal output, where $(P-N)_1$ and $(P-N)_2$ designate the two quadrature KET difference signals respectively.

The result is depicted in the continuous line of FIG. 6 indicating the value of the slope of the combined KET signal according to the above function. The maximal variation in the sensitivity is only 5% with this function. Nevertheless, the sign of the signal varies, not strictly meeting the definition of a single SDR, so this may not be suitable for every application. Nevertheless, in special situations where the sign of the signal is not important, for example when the information is spectral, than this function enables simple implementation. The proposed detection function may readily be implemented with well-known analog or digital electronics circuitry.

An alternative function for combining the two KET signals in quadrature is given by adding the squares of the two quadrature differential outputs, thereby eliminating the problem of the oppositely signed slopes, as represented by the function:

$$(P-N)_1^2 + (P-N)_2^2$$

The result of this detection function is depicted in the dotted line of FIG. 7 indicating the value of the slope of the combined KET signal according to the above function. The maximal variation in the sensitivity is 14% with this function. It does, however, offer a positive value for the slope for all values of illuminating beam spot shift, d. This detection function is more elaborate to implement with analog electronics but can be readily implemented with a digital circuit. It does meet the full requirement for a contiguous, expanded SDR as required.

Although the multiple beam arrangement does enable the achievement of a substantially increased dynamic range, the generation of multiple probe beams from a single source is disadvantageous, since the available light is divided up into the number of beams in the array, thereby reducing the power of each individual sensing beam, and decreasing the signal-to-noise ratio of each separate detector.

Figures 8A, 8B, 8C:
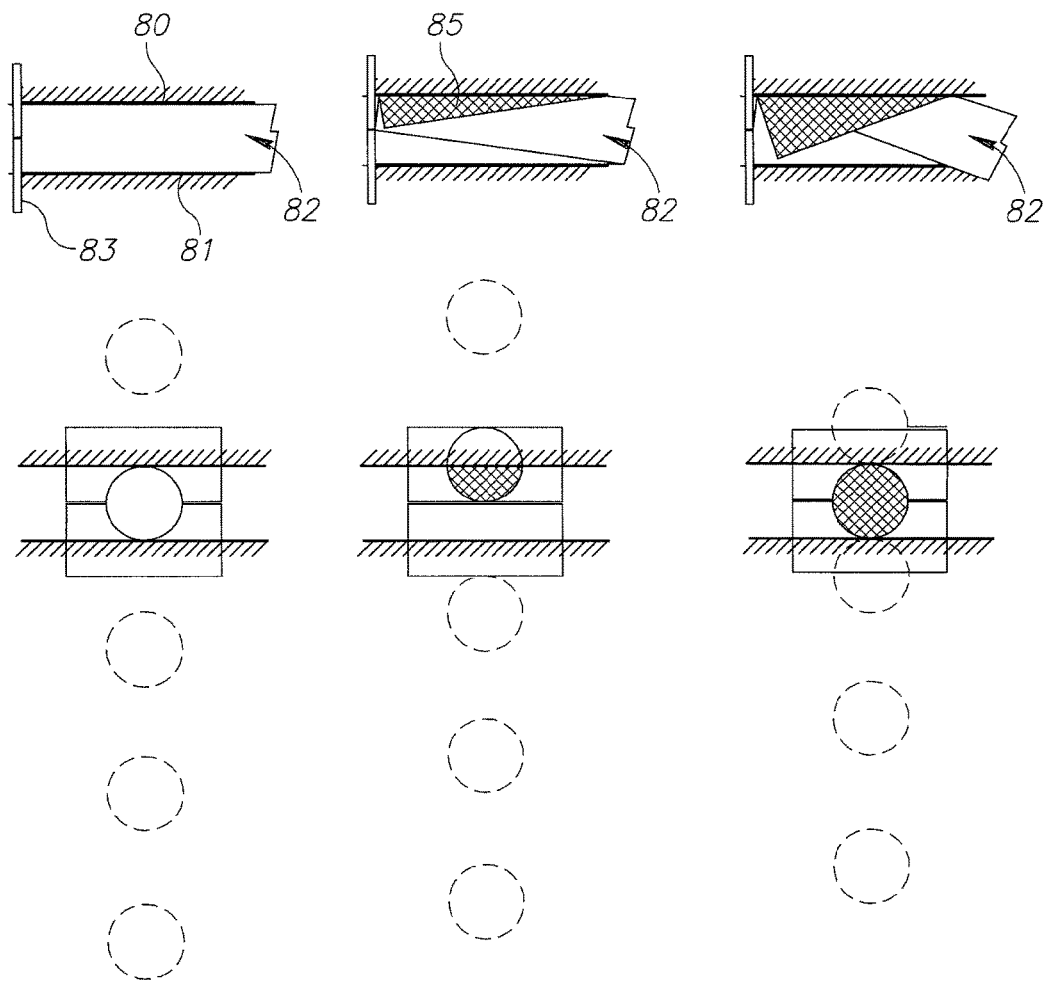
FIGS. 8A to 8C which illustrate a method of generating the multiple beam effect from a single sensing beam using a pair of mirrors disposed along the axis of the beam detection system enclosing a parallel corridor around the incident beam path.

Reference is now made to FIGS. 8A to 8C, which illustrate a novel method of the present disclosure, by which it is possible to generate the multiple beam effect but without need to divide the source beam up physically. The top row of drawings are side elevation views, while the bottom row of drawings represent an end-on view looking towards the surface of the split detector. A pair of mirrors 80, 81, is disposed along the axis of the sensing beam with their reflecting surfaces enclosing a parallel corridor around the incident beam path. The mirrors should be positioned symmetrically on either side of the beam axis, and at distances +r and −r from the axis, where r is the beam spot radius as it impinges on the split detector, such that only the central region of length 2r (in the direction of the beam motion to be detected), straddling the boundary between the two detector elements, is exposed to the inside of the corridor. In FIG. 8A, the beam 82 is shown in its undeflected position, traversing the mirror corridor without reflection from either mirror, and illuminating the split detector 83 with a spot exactly straddling the boundary between the two halves of the split detector. In effect, the detector need be no longer in the beam deflection direction than the 2r height of the mirror corridor, but it is drawn in the same way as in FIG. 4 for comparison purposes.

As the light beam is deflected as shown in FIG. 8B, such as by the cantilever motion, it no longer traverses the mirror corridor without impinging on at least one of the mirrors, and is reflected internally in its path down the corridor. In the example shown in FIG. 8B, as the beam impinges on the upper mirror 80, the darker shaded section thereof 85 indicates that part of the beam which is internally reflected back towards the beam axis. As is seen in the side elevation view at the top of FIG. 8B, at the angle at which the beam is tilted, part of the beam directly illuminates the exposed surface of the top element of the split detector, while the reflected part of the beam also illuminates the top element of the split detector. Thus, because of the presence of the top mirror 80, all of the light of the deflected beam now impinges only on the top element of the split detector, and none of the illumination gets to the bottom half of the split detector. This situation is identical to that shown in the central drawing set of FIG. 4, with the beam deflected such that its spot is now displaced a distance +r illuminating only the top element of the split detector. Thus, while in FIG. 4, all of the light that illuminates the top element of the split detector originates from direct illumination of the beam, in the implementation of FIG. 8B, the same total power of incident light originates partly from direct illumination of the beam and partly from light of the beam reflected from the upper mirror 80.

Figure 1:
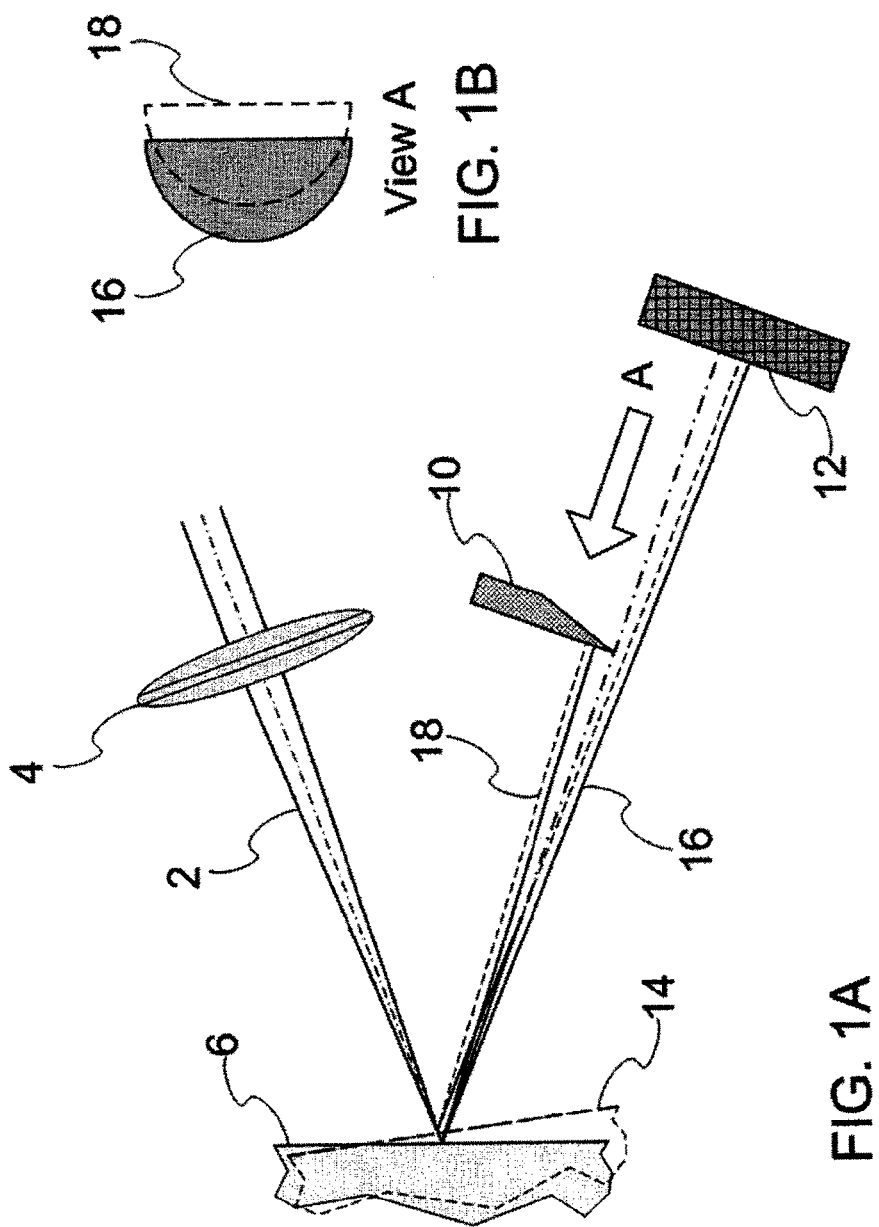
FIGS. 1A and 1B illustrate schematically the use of a prior art knife-edge technique in measuring the tilt of a surface.
Figure 2:
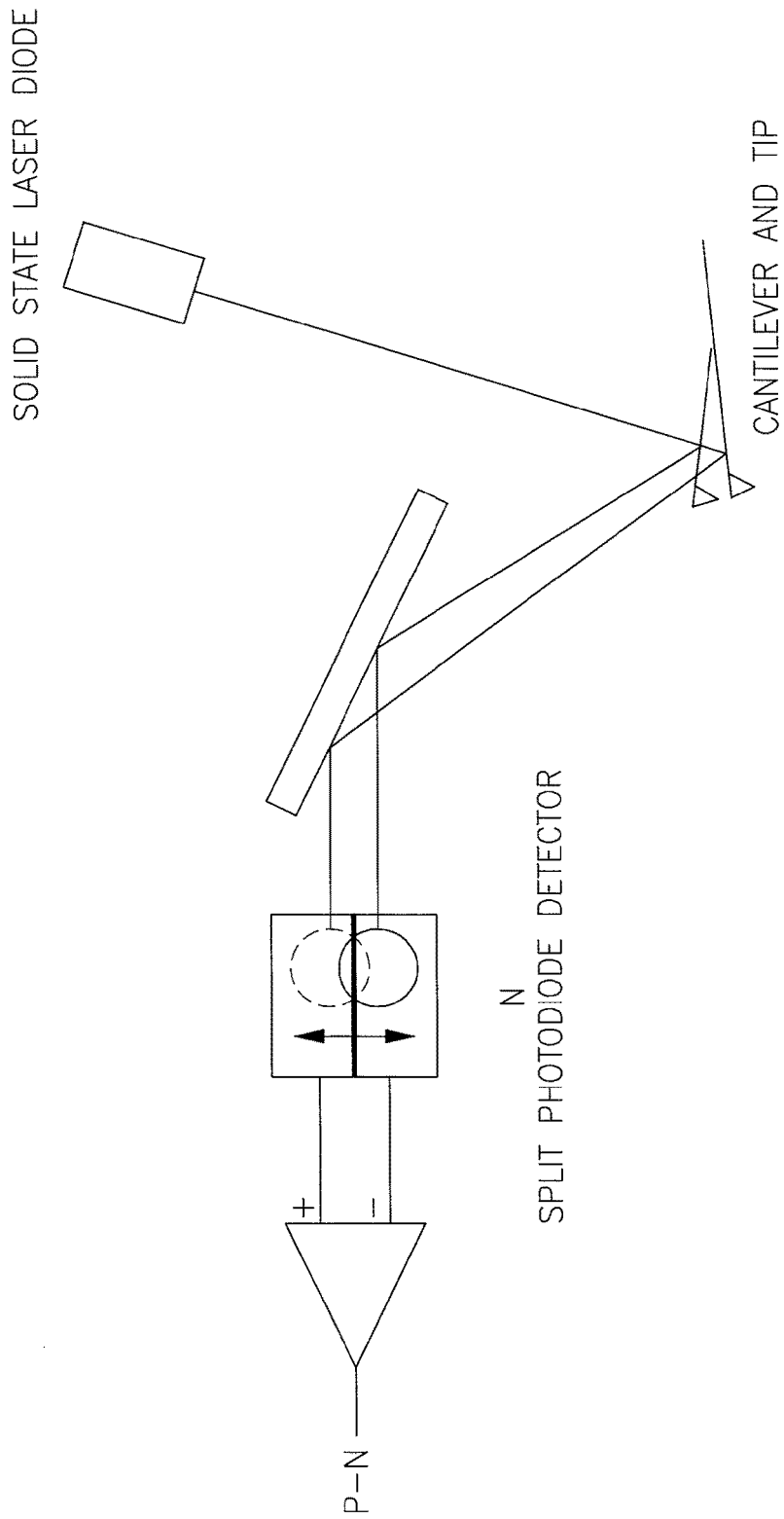
FIG. 2 is a schematic drawing of a prior art knife-edge detection system, where the knife-edge is defined by the boundary of a single split detector configuration.

As the beam is deflected even more, the whole of the beam is reflected back to cover the boundary area between the two elements of the split detector, as shown in FIG. 8C, and the detector outputs return to the situation of FIG. 8A, with equal illumination falling on each element of the split detector. The effect of the 2r height mirror corridor with a single internal beam reflection is thus to replicate the effect of an array of 3 beams impinging at different angles on the split detector, as illustrated in FIG. 4, and the basic knife-edge operation is maintained with the SSR extended by a factor of 3 over that of the basic single beam configuration shown in FIG. 2. Thus, the double mirror configuration of FIG. 8 with a single internal reflection of the sensing beam has enabled the dynamic range of a single beam to be increased by a factor of three, by the generation of two additional virtual beams from a single real beam. Although the mirrors in FIGS. 8A to 8C are shown disposed in a parallel configuration, it is possible to arrange them in a converging pattern, so long as their aperture to which the detector is exposed is equal to 2r, the diameter of the beam. Furthermore, although the split detectors are most conveniently mounted perpendicular to the incident directions of the beams, this also providing maximum sensitivity, they can be aligned at an angle to the perpendicular if circumstances require such mounting.

Figure 9:
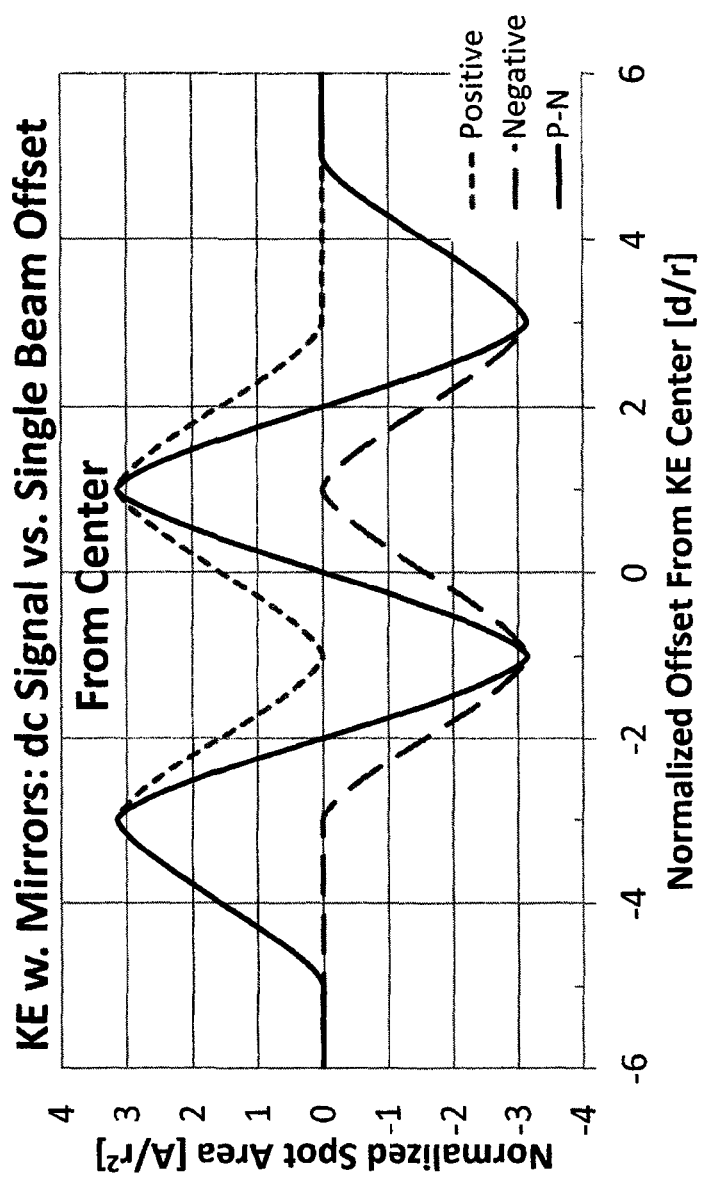
FIG. 9 is a graph showing the voltage outputs expected from the two elements of the split detector of the system of FIG. 8, as the beam spot is deflected from its axial position.

Reference is now made to FIG. 9, which is a graph showing the voltage output expected from the two elements of the split detector of FIG. 8, and the output from the differential amplifier which represents the difference between the two outputs, as the beam spot is deflected from its axial position.

Figure 10:
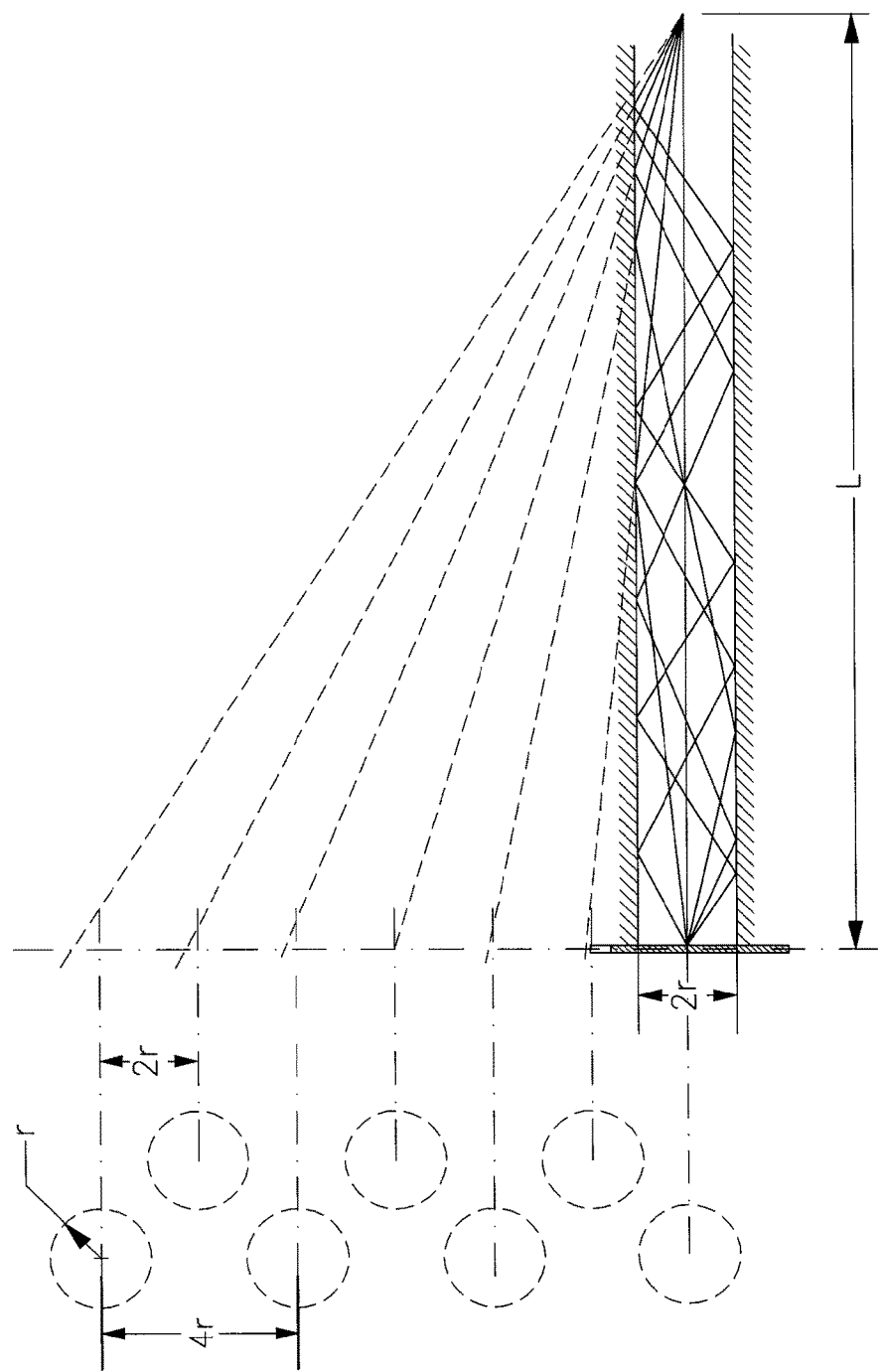
FIG. 10 illustrates schematically how the double mirror system of FIG. 8 can be implemented by use of an optical slab waveguide in place of the two mirrors.

As the beam deflection increases even more, and the length of the mirror corridor is increased accordingly, multiple inward reflections occur in the corridor, with the beam reflected off both the top mirror and the bottom mirror of FIG. 8. In principle a very large virtual array can be formed in this manner. Reference is now made to FIG. 10 which illustrates this situation for the upper half of the virtual array. The 2r spacing of the mirrors ensures that an array of virtual beams is generated spaced a distance 2r apart, and each additional deflection of the input beam by an angle $\tan^{-1}(2r/L)$, where L is the distance of the detector from the point of deflection of the monitor beam, results in another virtual beam generating the output signals on the split detector and its differential output amplifier. A convenient and advantageous way in which to implement the beam input arrangement of FIG. 10 is by use of an optical slab waveguide in place of the two mirrors. This can ensure an accurate alignment of the two mirror corridor and provides for essentially 100% reflection at the slab surface through total internal reflection. Because of the small spacing required between the two mirror reflection surfaces, an optical waveguide can be readily and accurately formed for this purpose.

There are two potential sources for inaccuracy in the system shown in FIG. 10. Firstly, as the angle of deflection increases, exceeding the small angle approximation, the separation of the virtual beam spot centers on the split detector increases, due to the difference between the value of $\tan\theta$ and the angle $\theta$ itself, the deflection angle of the beam. This can be seen in FIG. 10 for the larger deflection beams, where the center line of the deflected beam does not hit the plane of the split detector at a distance 2r from the previous virtual beam spot. However, for typical values of 2r and L used in practical systems, this inaccuracy is very small. Additionally, because of the increased effective distance from the pivot source of the beam to the detector plane at larger deflection angles, the size of the illumination spot on the split detector increases, such that the sensitivity drops off for the higher order deflections. For small angles this too is of secondary concern and still allows a large number of virtual illumination spots to be generated with a simple, uniform, flat-faced optical slab waveguide. Where high accuracy is important, the surfaces of the slab waveguide can be slightly curved to somewhat reduce the reflected angles of higher order virtual spots. Such compensation can bring back the centers of reflection of the virtual spots closer to the nominal array spacing of exactly 2r between spot centers. Such curvature of the top and bottom reflecting surfaces of the waveguide also serves to reduce the divergence of the higher order beam spots, reducing any inaccuracies due to their increase spot size on the detector's surface.

Reference is now made to FIGS. 11A and 11B and 12A and 12B, which illustrate practical ways in which the multiple beam quadrature KET described hereinabove can be implemented practically using the waveguide systems described in FIG. 10. In order to implement the systems, the beam must be split so that it passes down two separate waveguides arranged in quadrature to each other, which is achieved by arranging the detectors for each waveguide to be spatially separated by a distance d=r.

Figure 11A:
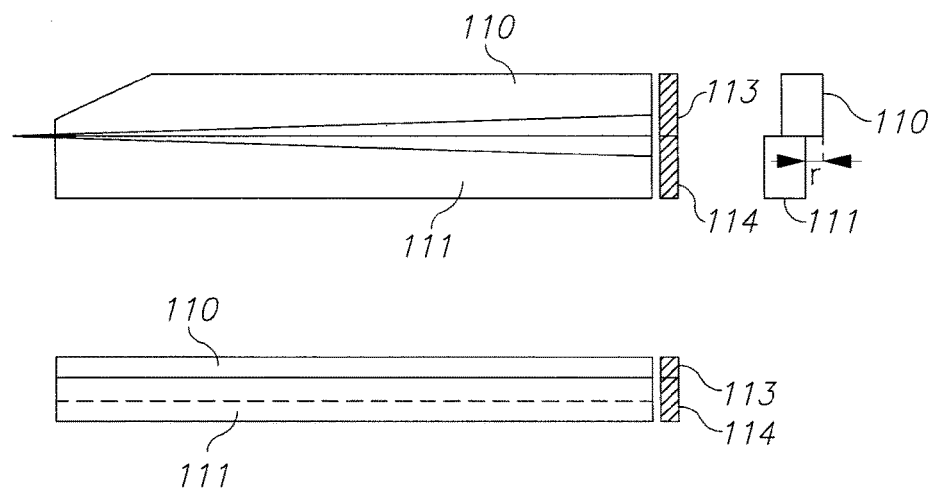
FIGS. 11A-B and 12A-B illustrate ways in which the multiple beam quadrature knife edge techniques can be implemented practically using the waveguide systems of FIG. 10.
Figure 11B:
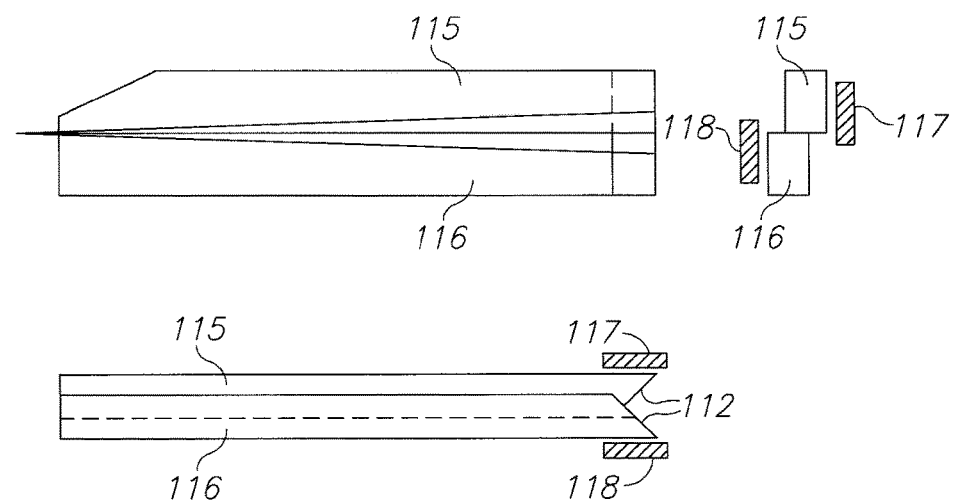

In FIG. 11A-B, there is shown two first configurations in which the two waveguides with their respective detectors can be arranged. In FIG. 11A, the light is split into two separate waveguides 110, 111, offset transversely by distance r from each other, as shown in the end view, each separate waveguide branch having its own split detector 113, 114 at its end. This configuration may be problematic to implement, in that the two split detectors need to be located close to each other without allowing room for any detector housing. Although the detector elements themselves should be separated by a distance r, the detector housings which may protrude significantly beyond the boundaries of the detector elements themselves, would interfere with each other, and prevent proper spacing of the detector elements. Therefore, an alternative configuration is suggested in FIG. 11B, in which the output beams from the two separate waveguides 115, 116 are directed sideways by means of a 45° angle reflection surfaces 112 at the end of the waveguides. The detectors 117, 118, may now be positioned on opposite sides of the waveguides, such that they do not prevent the accurate and close positioning of each relative to the other. The two configurations split the incident beam at its center perpendicular to the photodetector element pair abutment line; each half of the beam is directed to a different waveguide. While offering a compact implementation, these arrangement pose, however, difficult alignment requirements to ensure that the beam remains aligned in its traverse aspect so as to ensure equal power levels are guided down each waveguide.

Figure 12A:
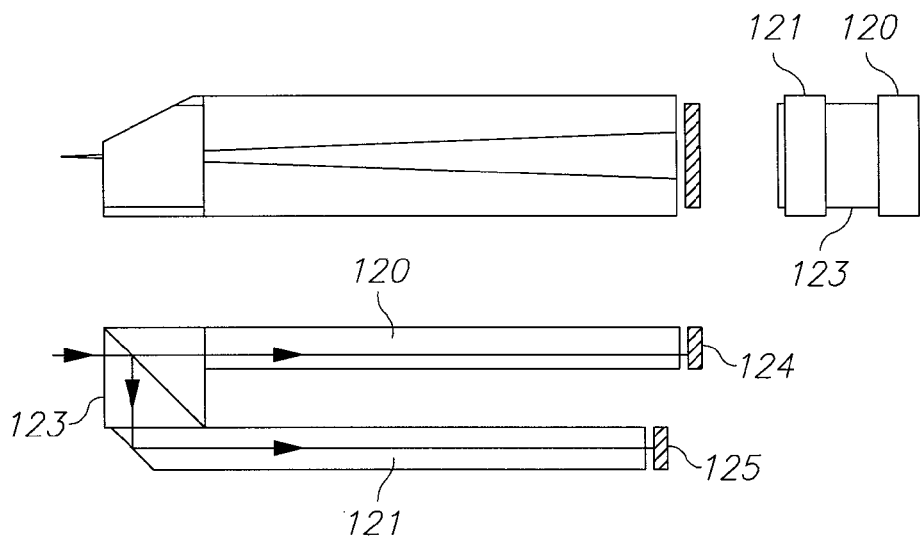
Figure 12B:
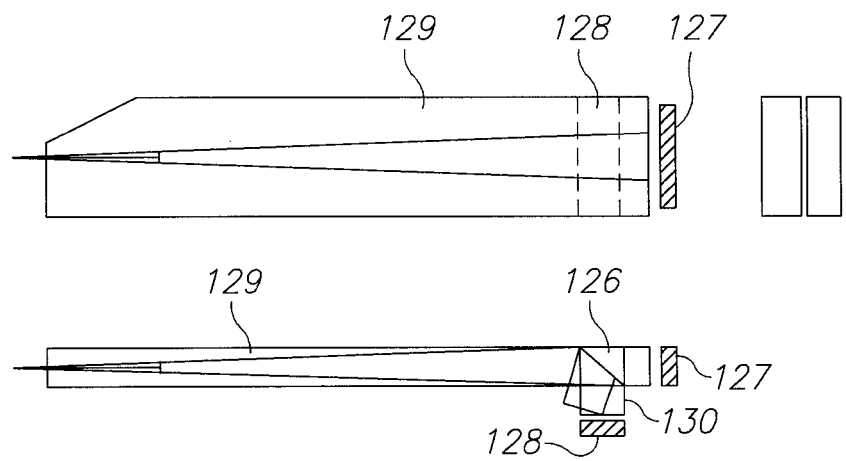

In FIGS. 12A and 12B, there are thus shown further configurations which enables a simpler alignment procedure to be used, in which the incident beam is split into its two paths 120, 121 by means of a beam splitter. Use of a beam splitter enables the two waveguides to be separated sufficiently that the split detectors 124, 125 can be positioned on the respective ends of the waveguides, accurately and without interfering with each other. In FIG. 12A, the beam splitter 123 is located right at the input end of the waveguides. The angle of the reflector 122 at the entrance to the second waveguide should be slightly different from 45° so that the beam, by the time it reaches the detector 125, is offset by the required d=r, to provide the quadrature detection to that of detector 124. One disadvantage of the position of the beam splitter at the entrance to the waveguides is that the angular deviation of the beam is limited by the comparatively long distance from the entrance of the waveguide to the detector end of the waveguide. Therefore, the SDR of the system is limited.

In the alternative implementation shown in FIG. 12B, the beam splitter 126 which divides the sensing beam into its two components to make the quadrature signal is located near the output end of the waveguide 129. The light thus traverses a single waveguide 129 for the majority of its travel, and is split only near the end of the waveguide 129 into its quadrature beams, one continuing directly to its detector 127, and the other being deflected to a stub waveguide 130 to reach its detector 128. Since the "source" of the light for the quadrature beams is close to the entry face of waveguide 129, a larger deflection angle can be accommodated, and the dynamic range of the signal can therefore be increased. To ensure that the beams arrive at the detectors in quadrature, the angle of the beam splitter has to be offset from 45°. The closer the beam splitter to the detector end, the larger the offset from 45°, so a compromise position for the beam splitter slightly removed from the end may be the most convenient position for practical purposes. On the other hand, if the detectors are physically small enough, the arrangement can be setup with no additional slab waveguide after the beam splitter, simplifying the construction. The sides of the beamsplitter can be cut to complement the waveguide dimensions. This ensures better performance of the waveguide reflected beams, which are incident at large incident angles, whereas the light that is designated to exit the waveguide towards the detector is incident at small incident angles and can exit the waveguide.

In applying the devices described hereinabove, one problem which needs addressing is the coupling of the sensor beam 2 reflected by the surface 6 whose motion is to be monitored, into the waveguide. In order to increase the acceptance angle of the waveguide 129 input, to provide coupling over as large a range of incident angles as possible, in order to provide the largest possible DDR, the surface 6 whose tilt or motion is to be monitored must be as close as possible to the input end of the waveguide 129. However, if the motion detected surface 6 is too close to the end of the waveguide, there is difficulty in geometrically positioning the sensing beam 2 incident on that surface, within the confines of the space available between the surface 6 and the proximal waveguide end.

Reference is now made to FIGS. 13A-C and 14A-B which illustrate alternative methods of providing geometrically efficient coupling of the reflected sensing beam into the waveguide. Using the beam-splitter waveguide arrangement of FIG. 12B as the waveguide into which the reflected light must be coupled, FIG. 13A shows a straightforward coupling arrangement using a 90° beam-splitter 140 disposed at the input end of the waveguide 129. The input beam is directed into the beam splitter 140 essentially parallel or close to parallel to the motion detection surface 6. However, this arrangement suffers from loss of 75% of the incident light in the beam splitter 140—50% being lost in the reflection down towards the detection surface 6, and half of the reflected light during passage through the beam splitter on its return passage onto the end of the waveguide 129. This loss of light in the beam splitter can be minimized by using a polarizing beam splitter (PBS) and a linearly polarized incident beam 2, polarized in a direction relative to the PBS such that this incident polarization is reflected by the PBS towards the surface 6. A quarter waveplate (not shown in the drawing) is inserted between the PBS and the surface 6, to convert the input linear polarization into a circular polarization. After reflection from the surface 6, transmission through the quarter waveplate in the reverse direction then changes the circular polarization back into linear polarization, but in the direction orthogonal to that of the incident beam. As a result, the light re-entering the PBS is transmitted therethrough and into the waveguide with negligible light loss. It may also be convenient to fold the incoming beam 2 with an optional reflecting surface, such as may be formed by a prism 141, disposed such that the incoming beam 2 is redirected into the beam splitter 140 perpendicular to its input surface.

However, use of a beam splitter of any kind at the input to the waveguide hardly solves the main problem of the limitation of the acceptance angle, since the input face of the waveguide 129 is offset away from the motion detection surface 6 by the physical size of the beam splitter 140, thus reducing the acceptance angles of the waveguide 129, essentially limiting the range of incident angles and hence the resulting SDR. It is therefore advantageous to bring the input surface of the waveguide 129 as close as practical to the motion detection surface 6, and the arrangements of FIGS. 13B and 13C illustrate alternative structures for so doing.

In FIGS. 13B and 13C, the incident beam 2 is folded by means of multiple reflections inside a prism, which also serves to redirect the incident beam, after reflection from the detection surface 6, back into the waveguide 129. FIG. 13B shows an implementation with a prism 143 with an apex of 30°. This arrangement ensures that the beam is incident on the prism's reflecting surfaces at angles ensuring total internal reflection (TIR), until it is transmitted out of the prism onto the motion detection surface 6. After reflection therefrom, the beam is then incident on the top (in FIG. 13B) surface at an angle smaller than the critical angle for TIR and this light is transmitted into the waveguide 129. Similarly, FIG. 13C shows an implementation with a prism 144 with an apex of 20°. In this arrangement there are also two TIR reflections within the prism and finally transmission of the beam reflected off the detection surface 6 through the top surface of the prism at angles below TIR. Both of these exemplary arrangements enable relatively small offsets of the waveguide's input surface from the detection surface, and minimal loss of light.

Figure 14B:
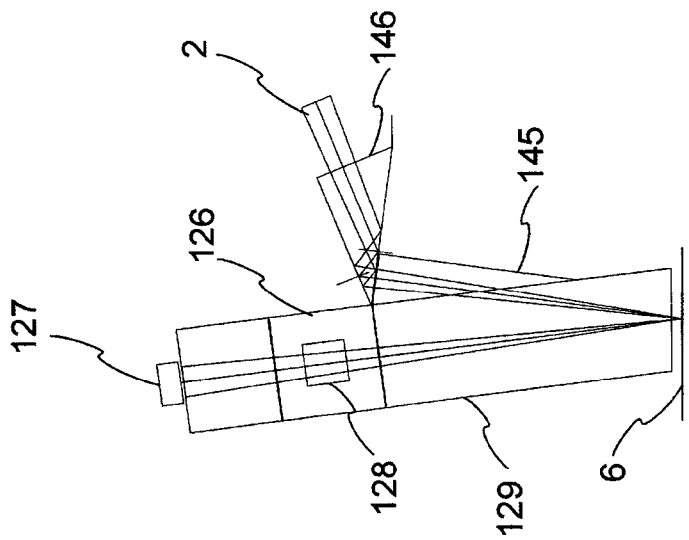
Figure 14A:
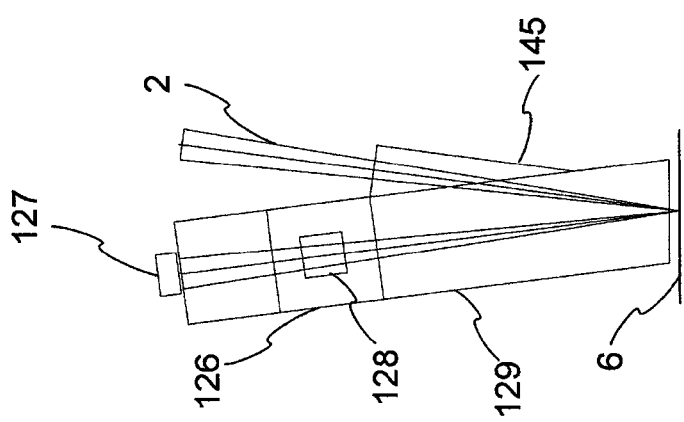

Reference is now made to FIGS. 14A and 14B which show alternative arrangements for efficient coupling of the incident light reflected into the waveguide. Here the waveguide 129 is shown at right-angles to the views of FIGS. 13A to 13C. In this arrangement, the input optical beam 2 is directed into the waveguide 129 through an additional optical transmission component in the form of a prism 145 optically to the side of the waveguide 129, such that light directed into the end of the prism 145 will pass without reflection into the side of the waveguide. The use of this side prism thus enables the beam 2 to be input into the waveguide 129 at an angle close to glancing angle, yet without the beam being reflected off the waveguide side, such that it is coupled into the waveguide at a small angle from the optical axis of the waveguide. At such a small off-axis angle, the end of the waveguide 129 can be positioned very close to the motion deflection surface 6, and this enables a large acceptance angle to be obtained in the waveguide 129, thereby enabling a large SDR. FIG. 14A shows an optional arrangement with the incident beam 2 directed unfolded into the waveguide prism 145 and then into the waveguide 129. FIG. 14B shows a similar arrangement with an additional 30° apex folding prism, so that the axis of the incident light is aligned at a larger angle to the optical axis of the waveguide 129, allowing more mechanical space for positioning the components needed to complete the sensing system, such as a lens and a light source (not shown in FIGS. 14A and B). Although the side prism 145 is shown as a separate component optically attached to the side of the waveguide 129, it is to be understood that the waveguide could equally well be constructed of one piece of transmissive optical material, in the shape of the two components currently proposed.

Using any of the waveguide configurations of FIGS. 8 to 14, an increase in SDR of a factor of 40 or more can be achieved, as compared with the prior art single beam detection system.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

I claim:

1. A system for monitoring change in the direction of incidence of a light beam having a predetermined effective diameter, comprising:
   a pair of optical reflecting surfaces disposed such that said light beam traverses between them, and aligned generally perpendicular to the direction in which said change in said direction of incidence of said light beam is to be monitored; and
   a pair of juxtaposed photodetector elements disposed at one end of said pair of optical reflecting surfaces, the boundary between said juxtaposed pair being aligned such that the illumination spot of said beam passes from one photodetector element to the other as the direction of incidence of said light beam changes,
   wherein said pair of optical reflecting surfaces are spaced and disposed such that change in the direction of incidence at which said light beam enters said pair of optical reflecting surfaces, results in said light beam switching between reaching said photodetector elements (a) without reflection from either optical reflecting surface, and (b) with reflection from at least one of said optical reflecting surfaces.

2. The system according to claim 1 wherein said boundary is located in the center of the space between said optical reflecting surfaces.

3. The system according to claim 1, wherein said pair of optical reflecting surfaces are disposed such that said light beam traversing between said pair of optical reflecting surfaces illuminates sequentially said pair of photodetector elements as its direction of incidence changes.

4. The system according to claim 1, wherein said pair of optical reflecting surfaces are spaced apart at least by a distance equal to the effective diameter of said illumination spot of said light beam on the surfaces of the pair of photodetector elements.

5. The system according to claim 1, wherein the signals from said pair of photodetector elements change sequentially with the change in direction of incidence of said light beam.

6. The system according to claim 1, wherein said pair of optical reflecting surfaces are a pair of mirror surfaces.

7. The system according to claim 1, wherein said pair of optical reflecting surfaces are the outer surfaces of an optical waveguide.

8. The system according to claim 1, wherein said pair of optical reflecting surfaces extends from said pair of photodetector elements to the vicinity of the point of divergence of the beam.

9. The system according to claim 1, wherein said boundary between said juxtaposed pair photodetector elements is aligned perpendicular to the direction in which said incidence angle of said beam is to be measured.

10. The system according to claim 1, wherein said pair of photodetector elements have the same size along the direction in which said change in said direction of incidence of said light beam is to be monitored.

11. The system according to claim 10, wherein said dimension of each of said pair of photodetector elements is at least equal to the effective diameter of said light beam at the point of impingement on said photodetector elements.

12. The system according to claim 1, wherein said change in the direction of incidence of said light beam arises from reflection of a light beam off a mechanical nanometric position monitoring element.

13. The system according to claim 1, wherein said change in the direction of incidence of said light beam is determined from the signal arising from the difference between the signals generated by the impingement of said light beam on each of said pair of photodetector elements.

14. The system according to claim 1,
   wherein said pair of optical reflecting surfaces are a first pair, and said pair of photodetector elements are a first pair, and wherein said system further comprises a second pair of optical reflecting surfaces and a second pair of photodetector elements, and wherein said light beam is split by a beam splitter such that a first part traverses said first pair of optical reflecting surfaces and illuminates said first pair of surfaces and a second part traverses said second pair of optical reflecting surfaces illuminates said second pair of photodetector elements,
   wherein said first and second pair of photodetector elements are disposed such that the boundaries between said juxtaposed pair of said first and second pair of photodetector elements are a distance apart in the direction in which said change in said direction of incidence of said light beam is to be measured, at least equal to the effective radius of the light beam.

15. The system according to claim 14, wherein the difference signals from said first pair of photodetectors and the difference signals from said second pair of photodetectors are processed to select the largest absolute value of each so as to ensure an extended setup sensitivity range for the system.

16. The system according to claim 14, wherein the sum of the square of the difference signals from said first pair of photodetectors and the square of the difference signals from said second pair of photodetectors provide a monitor signal by which the direction of the incidence of said light beam may be monitored over a large dynamic range.

17. The system according to claim 1, wherein said pair of juxtaposed photodetector elements is either two separate photodetector elements abutted to each other, or is a single photodetector scribed to generate two separate photodetector elements.

18. A system according to claim 1 wherein said pair of juxtaposed photodetector elements are located:
(i) either in the space between said optical reflecting surfaces, or
(ii) laterally at a side of said optical reflecting surfaces, said system comprising a further reflecting surface disposed in the space between said optical reflecting surfaces such that it deflects said beam to said side.

19. A method of increasing the dynamic range of an optical knife-edge detection system for detecting motion of a surface to be monitored, comprising:
projecting a light beam onto said surface;
positioning a pair of optical reflecting surfaces such that said light beam reflected from said surface to be monitored traverses between them, directly or following optical deviation, said pair of optical reflecting surfaces being aligned generally perpendicular to the direction in which said reflected light beam moves as a result of motion of said surface to be monitored; and
disposing a pair of juxtaposed photodetector elements at an end of said pair of optical reflecting surfaces remote from where said reflected light beam enters between said pair of optical reflecting surfaces, the boundary between said juxtaposed pair being aligned such that the illumination spot of said reflected light beam on said pair of juxtaposed photodetector elements passes from one photodetector element to the other as the surface to be monitored moves,
wherein said pair of optical reflecting surfaces are spaced and positioned such that change in the direction of incidence at which said reflected light beam enters said pair of optical reflecting surfaces, causes said light beam that enters the pair of optical reflecting surfaces to traverse between them either without reflection from either optical reflecting surface, or after reflection from at least one of said optical reflecting surfaces, according to said motion of said surface.

* * * * *